Jan. 10, 1933.   C. D. CAMPBELL   1,894,157
SIDE DRESSING MACHINE
Filed June 27, 1931

C. D. Campbell
INVENTOR

BY Victor J. Evans
and Co. ATTORNEY

Patented Jan. 10, 1933

1,894,157

UNITED STATES PATENT OFFICE

CHARLES D. CAMPBELL, OF SPRINGDALE, ARKANSAS

SIDE DRESSING MACHINE

Application filed June 27, 1931. Serial No. 547,428.

This invention relates to a side dressing machine especially adapted to permit commercial fertilizer to be easily and quickly distributed on the ground about a plant without coming in direct contact with the plant or the foliage thereof, thus obviating the possibility of the fertilizer burning or injuring the foliage of the plant.

Another object of this invention is the provision of a device of the above stated character which will be portable and easy to handle and to place fertilizer therein and dispense therefrom as desired and which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation of a side dressing machine constructed in accordance with my invention.

Figure 5 is a perspective view illustrating the control valve.

Figure 1:
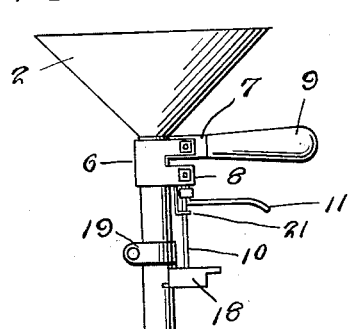

Referring in detail to the drawing, the numeral 1 indicates a tubular pipe of any desired length and has secured to its upper end a funnel shaped element 2 whereby commercial fertilizer and the like may be dispensed into the device in desired amounts. A sleeve 3 is secured to the pipe 1 adjacent the other end thereof and is provided with arcuately shaped attaching arms 4 secured to a conical shaped deflector 5, with the apex of the latter disposed adjacent to and directly under the lower end of the pipe 1 so that fertilizer discharged from the pipe will engage the deflector and be spread evenly onto the ground about a growing plant without coming in direct contact with the latter. It is to be understood that in using the device the conical shaped deflector 5 is placed over the plant.

Figure 2:
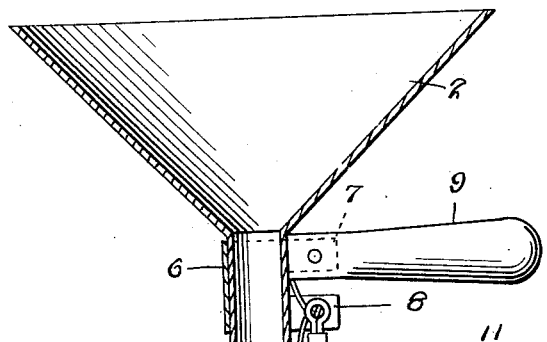
Figure 2 is a vertical sectional view illustrating the same.
Figure 4:
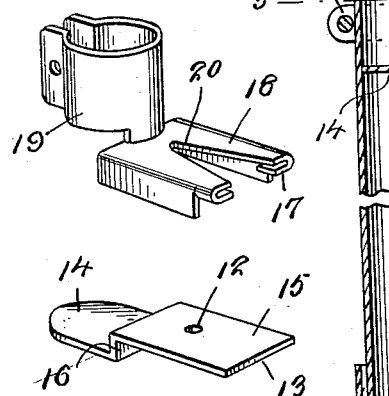
Figure 4 is a perspective view illustrating a mounting for the control valve.
Figure 3:
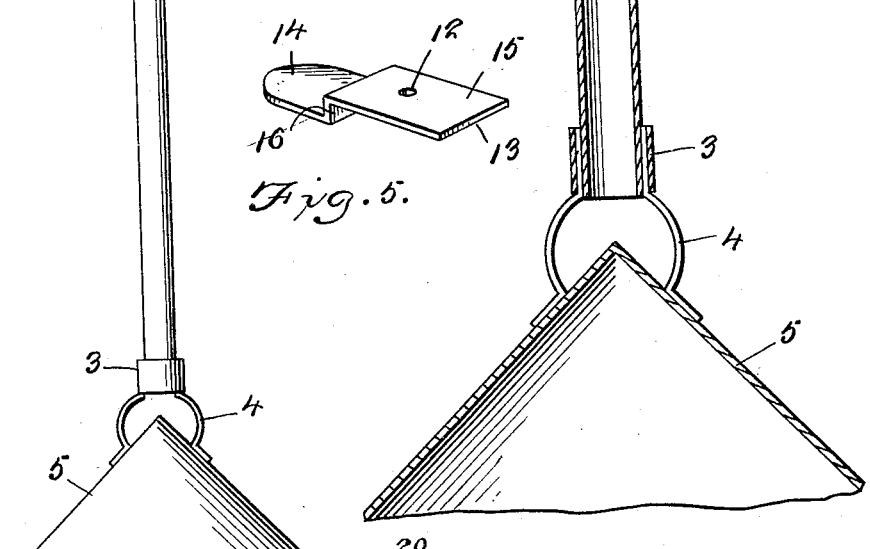
Figure 3 is a sectional view taken on the line 3—3 of Figure 2.
Figure 3:
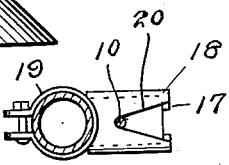

A sleeve 6 is secured to the pipe 1 adjacent its upper end and has formed thereon pairs of ears 7 and 8 and the ears 7 are secured to a handle 9 whereby the device may be conveniently supported in one hand of the user. A valve operating lever 10 is pivoted to the ears 8 and has formed thereon a finger piece 11 extending substantially in parallelism with the handle 9 and the lower end of the lever is disposed in an opening 12 of a control valve 13. The control valve 13 includes portions 14 and 15 integrally connected with each other by an angularly disposed wall 16 forming a shoulder to abut the pipe 1 when the valve is in a closed position as shown in Figure 2. It is to be understood that the portion 14 extends into the pipe by way of a slot while the portion 15 is disposed exteriorly of the pipe and is slidably mounted in guide flanges 17 of a plate 18. The plate 18 is formed integral with a split collar 19 adjustably secured to the pipe 1. The plate 18 is provided with a V-shaped notch 20 to permit free movement of the valve operating lever 10. The control valve is normally urged into a pipe closing position by means of a spring 21 which is coiled about the pivot of the lever 10 and has one end bent to form a hook 22 engaging said lever while the opposite end bears against the pipe.

In operation, a person grips the handle 9 in one hand and places the desired amount of fertilizer within the funnel shaped element 2 and places the deflector 5 over the plant and by rocking the lever 10 on its pivot, the valve 13 will be moved into a position to open the pipe 1 and allow the fertilizer to discharge onto the deflector 5 and thence gravitate to the ground about the plant without coming in direct contact with the foliage.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A control comprising a pipe of a side dressing machine for conveying fertilizer between a hopper and a deflector and provided with a slot, a collar secured to the pipe, a plate on said collar and extending at rightangles thereto and to the pipe, guide means on the plate, a valve element slidable in the pipe by way of the slot and having an offset portion slidably received by the guide means, and a control lever pivoted to the pipe and connected to the valve element.

2. A control comprising a pipe for establishing a connection between a hopper and a deflector of a side dressing machine and having a slot, a handle secured to the pipe, a collar secured to the pipe, a plate on said collar and extending at rightangles thereto and to the pipe and having a V-shaped notch, guide flanges on the plate, a valve plate slidable in the pipe by way of the slot and having an offset portion slidably received by the flanges, a control lever pivoted to the pipe and including angularly disposed portions with one of said portions extending substantially in parallelism with the handle and the other portion extending through the notch and connected to the offset portion.

3. A control comprising a pipe for establishing a connection between a hopper and a deflector of a side dressing machine and having a slot, a handle secured to the pipe, a collar secured to the pipe, a plate on said collar and extending at rightangles thereto and to the pipe and having a V-shaped notch, guide flanges on the plate, a valve plate slidable in the pipe by way of the slot and having an offset portion slidably received by the flanges, a control lever pivoted to the pipe and including angularly disposed portions with one of said portions extending substantially in parallelism with the handle and the other portion extending through the notch and connected to the offset portion, and a tension means associated with the control lever for normally urging the valve plate into pipe closing position with one end of the offset portion abutting the outer face of the pipe.

In testimony whereof I affix my signature.

CHARLES D. CAMPBELL.